March 15, 1927.
R. J. LANGER
1,621,209
STANCHION
Filed Nov. 21, 1925
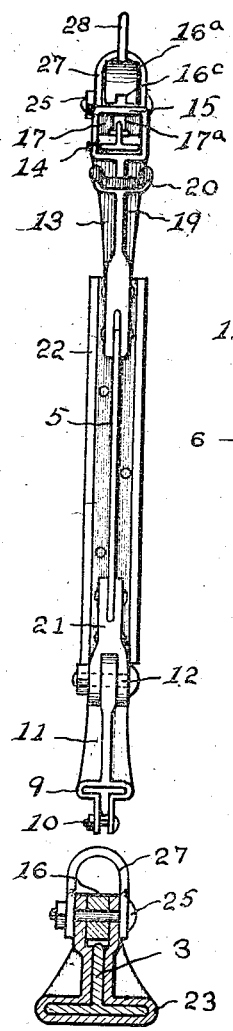
Fig. 2.
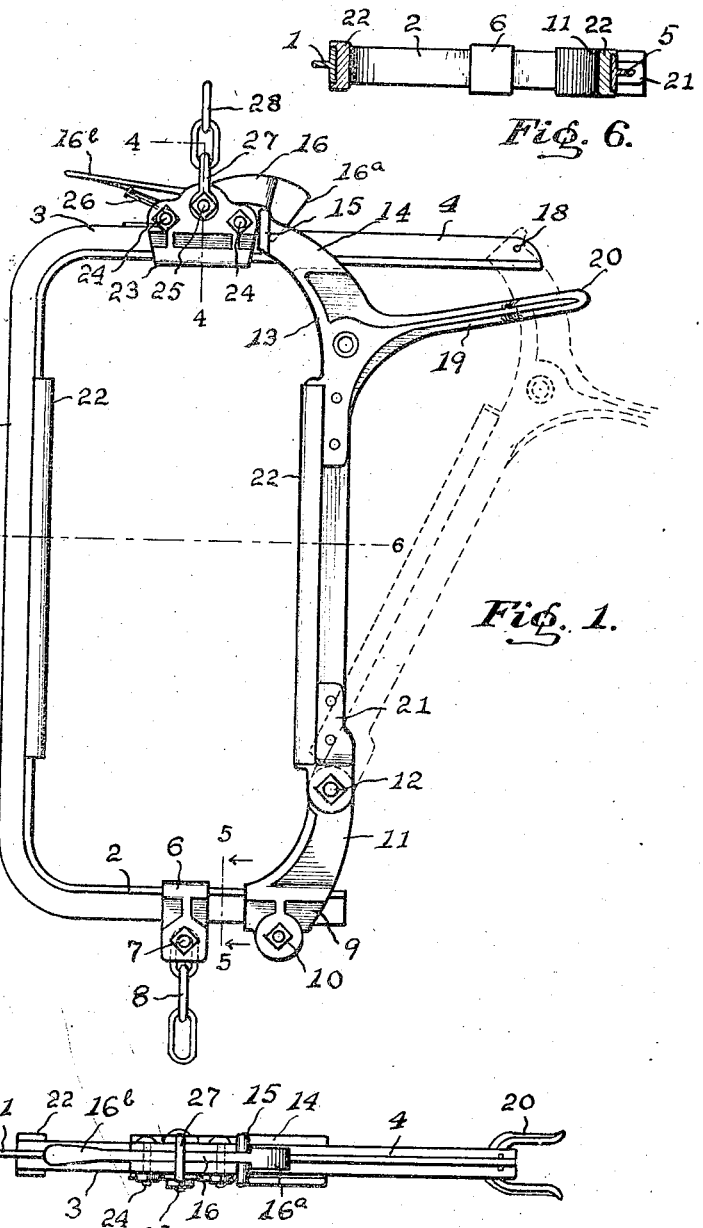
Fig. 6.
Fig. 1.
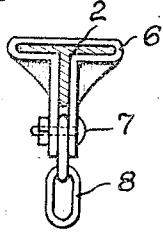
Fig. 4.
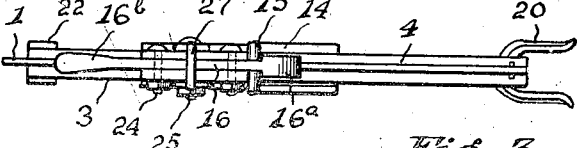
Fig. 3.
Fig. 5.
Inventor
R. J. Langer
By Robb, Robb & Hill
Attorneys Patented Mar. 15, 1927.

1,621,209

UNITED STATES PATENT OFFICE.

RUDOLPH J. LANGER, OF MONTICELLO, IOWA, ASSIGNOR, BY MESNE ASSIGNMENTS, TO FRANKLIN EQUIPMENT COMPANY, OF MONTICELLO, IOWA, A CORPORATION OF IOWA.

STANCHION.

Application filed November 21, 1925. Serial No. 70,451.

The present invention relates to a stanchion and has for its object to provide a device of this character which embodies novel features of construction whereby the width of the stanchion can be adjusted for different sizes of cattle and the upper end of the swinging side of the stanchion is firmly supported when in an open position so that the hinge is effectively prevented from injury should the cow or other animal attempt to walk through the stanchion and bear against the upper part of the open swinging side with considerable force.

Further objects of the invention are to provide a secure and easily operated latch for the swinging side of the stanchion, and also to provide the swinging side with a laterally projecting fork member which will engage a stall-post when the stanchion is open.

Further objects of the invention are to provide a stanchion which will hold the cow or other animal without discomfort, which comprises few and durable parts which are not liable to break or get out of order, and which can be manufactured at comparatively small cost.

While one particular embodiment of the invention is shown and described for illustrative purposes, it will be understood that many modifications and changes can be made in the details of construction without departing from the spirit of the invention.

For a full understanding of the invention reference is to be had to the following description and accompanying drawing in which:

Figure 1 is a front elevation of a stanchion which is constructed in accordance with the invention, the swinging side of the stanchion being shown by full lines in a closed position and by dotted lines in an open position.

Figure 2 is a side elevation of the stanchion, showing the swinging side thereof.

Figure 3 is a top plan view of the stanchion with the suspending chain removed.

Figure 4 is an enlarged sectional view on the line 4—4 of Figure 1.

Figure 5 is a similar view on the line 5—5 of Figure 1.

Figure 6 is a horizontal sectional view on the line 6—6 of Figure 1.

Corresponding and like parts are referred to in the following description and indicated on all of the views of the drawings by like reference characters.

Referring to the drawings, the numeral 1 designates the fixed side of the stanchion, 2 the bottom of the stanchion, and 3 the top thereof, the said three parts being preferably integral with each other and being shown as formed by bending a single length of T-iron. The top or head 3 of the stanchion is formed with an extension or continuation 4 which projects laterally from one side of the stanchion when the stanchion is closed. The swinging side 5 of the stanchion has a spaced and substantially parallel relation to the fixed side 1 and co-operates therewith in the usual manner to confine a cow or other animal by engaging opposite sides of the neck thereof when the stanchion is closed.

The bottom 2 of the stanchion has a casting or slide 6 adjustably mounted thereon, said casting being shaped to receive the T-iron and having opposite sides which extend below the lower edge of the T-iron and are connected by a bolt 7. This bolt also engages the upper link of the lower chain 8 and when the bolt is loosened the slide 6 can be moved along the bottom of the stanchion, while when the bolt is tightened the slide is clamped securely in position and held against movement.

A second slide 9 is mounted upon the bottom 2 of the stanchion at the end thereof and this slide is provided with a bolt 10 by means of which it can be securely clamped in an adjusted position. A curved hinge arm 11 projects upwardly from the slide 9 and the lower end of the swinging side 5 of the stanchion is hingedly connected thereto at 12.

The upper end of the swinging side 5 of the stanchion is provided with a curved arm 13 terminating in a keeper 14 having an opening therethrough which receives the top of the stanchion. The sides of the keeper slidably engage the top 3 of the stanchion and the extension 4 thereof and co-operate therewith at all times, regardless of whether the stanchion is open or closed, to remove all strain from the hinge 12. The end of the keeper has an upwardly projecting head 15 which is adapted to be engaged by the nose 16ª of the latch 16 to lock the stanchion in a closed position. As shown by Figure 2 the mouth of the keeper 14 is provided at the top thereof with a transverse web 17 which has the middle portion thereof notched at 17ª to receive the upright flange of the T-iron. When the swinging side 5 of the stanchion is moved to the limit of its outward movement this web 17 engages the ends of a transverse stop pin 18 which is fitted in the end of the extension 4.

The swinging side 5 is provided at its upper end with a lateral arm 19 terminating in a fork 20 which is adapted to engage one of the posts of the stall and hold the stanchion more or less stationary when it is open. When the stanchion is closed this lateral arm is withdrawn into an inoperative position under the lateral extension 4 so that it will not bump against the stall-posts as the cow moves about in the stanchion. The swinging side 5 is shown as comprising a length of T-iron having the curved arm 13 riveted or otherwise secured to the upper end thereof and a hinge member 21 riveted or otherwise secured to the lower end thereof. This swinging side 5 and the fixed side 1 of the stanchion are lined with strips 22 of wood which prevent the metal parts from coming into direct contact with the neck of the animal and enable the animal to be held without discomfort.

The slide 23 is adjustably mounted upon the top or head 3 of the stanchion. The slide is shaped to fit the T-iron of the stanchion and has opposed side portions 23ª which extend upwardly above the stanchion where they are connected by the clamping bolts 24 and pivot bolt 25. When the bolts 24 are loosened the slide is adjustable and can be moved to different positions on the stanchion head, while when the bolts are tightened the slide is clamped in position. The latch member 16 has the middle portion thereof received between the sides 23ª of the slide 23 and pivoted upon the bolt 25. One end of the latch member 16 terminates in the hooked end or nose 16ª which is adapted to engage the head 15 of the swinging side of the stanchion. The other end of the latch member is in the form of a handle 16ᵇ which projects on the opposite side of the slide and is engaged by a spring 26 which normally tends to move the latch member into operative position. The spring 26 is shown as having the middle portion thereof coiled around one of the clamping bolts 24, one end of the spring engaging the handle 16ᵇ of the latch member while the other end of the spring obtains a bearing on the top of the stanchion.

A clevis 27 has the ends thereof engaged by the transverse bolt 25 and is connected to the chain 28 by means of which the stanchion is suspended. The bolt 25 accordingly performs the double function of a pivot element for the latch member and a connecting means for the suspending chain. The nose 16ª of the latch member has a bevelled end so that when the stanchion is closed the head 15 will co-operate with the said bevelled nose to lift the head of the latch member against the action of the spring 26 until after the head 15 has passed under the nose of the latch member the latter can spring into operative position. As shown by Figure 2, in which the latch member is indicated as swung into inoperative position, the lower end of the nose of the latch member is formed with a notch 16ᶜ which receives the upper edge of the T-iron of the frame when the latch is in operative position. In order to open the stanchion it is necessary to press downwardly upon the handle 16ᵇ and swing the latch member against the action of the spring 26 to release the swinging side of the stanchion, whereupon the latter can be swung outwardly until the internal web 17 of the keeper 14 engages the stop pin 18 and the fork 20 at the end of the lateral arm 19 engages one of the posts of the stall. As previously stated the upper end of the swinging side 5 is supported by the lateral extension 4 at the top of the stanchion so that the hinge 12 is relieved of all strain and there is no possibility of the swinging side 5 being bent rearwardly. The extension 4 at the top of the stanchion also serves to guide and direct the swinging side 5 of the stanchion in its movements and to bring the head 15 into proper engagement with the latch member when the stanchion is closed.

An important feature of the stanchion is the fact that the top and bottom chains are connected to slides which are adjustable along the top and bottom respectively of the stanchion, and the swinging side 5 is carried by a slide 9 which is adjustable on the bottom 2 of the stanchion so that the distance between the sides of the stanchion can be varied. This enables the stanchion to be adjusted to fit different sizes of animals or cattle and to obtain the most effective results upon the animals or cattle with which it is used.

Having thus described my invention what I claim as new and desire to secure by Letters Patent is:

1. A stanchion including a main frame formed with a fixed side and laterally projecting top and bottom bars which are rigid with the fixed side, a slide adjustably mounted on the bottom bar, an upwardly extending hinge arm projecting from the slide, a swinging side pivotally mounted on the hinge arm, a slide adjustably mounted on the top bar, a rigid arm projecting upwardly from the swinging side, and latch means carried by the slide on the top bar to overhang the arm at the upper end of the swinging side to hold the swinging side in a closed position.

2. A stanchion including a main frame formed with a fixed side and top and bottom bars which project laterally from said side, an adjustable vertically extending bearing support mounted upon the bottom bar, a swinging side pivoted upon said support, a rigid arm projecting from the upper end of said side and terminating in a closed keeper constructed to embrace the top bar, a fitting adjustable upon the top bar against which said keeper abuts when the swinging side is in closed position, and a latch member mounted on said adjustable fitting and adapted to engage the said keeper to retain it in contact with the fitting.

3. A stanchion including a main frame formed with a fixed side and laterally projecting top and bottom bars which are rigid with the fixed side, a swinging side, means for pivotally mounting the swinging side on the bottom bar, a rigid arm projecting from the upper end of the swinging side and terminating in a keeper which is slidably interlocked with the top bar, a fitting mounted on the upper bar, suspension means connected to the fitting, and a latch member pivotally mounted on the fitting and having a nose extending over the keeper to lock the swinging side in a closed position.

4. A stanchion including a main frame formed with a fixed side and top and bottom bars which project laterally from the fixed side and are rigid therewith, the top bar having an inverted T-shaped cross section, a swinging side, means for pivotally mounting the swinging side on the bottom bar, an arm projecting from the upper end of the swinging side and terminating in a closed keeper which is adapted to receive the top bar, said keeper being formed with an internal web which is notched to receive the upright flange of the T-iron, a fitting on the top bar against which the keeper abuts when the swinging side is in closed position, and a latch member mounted on the fitting and adapted to engage the keeper to lock the swinging bar in closed position.

5. A stanchion including a main frame formed with a fixed side and top and bottom bars which project laterally from the fixed side and are rigid therewith, said top bar being formed with an extension, and the top bar and extension having an inverted T-shaped cross section, a swinging side, means for hingedly mounting the swinging side on the bottom bar, an arm projecting from the swinging side and formed with a keeper adapted to receive the top bar, an internal web arranged within the keeper and formed with a notch to slidably receive the flange of the T-bar, a transverse stop pin fitted in the extension of the top bar and adapted to be engaged by the web of the keeper to limit the outward swinging movement of the swinging side, a fitting on the top bar against which the keeper abuts when the swinging side is in a closed position, and a latch member mounted on the fitting and adapted to engage the keeper to lock the swinging side in a closed position.

6. A stanchion including a main frame formed with a fixed side and top and bottom bars which project laterally from the fixed side and are rigid therewith, a swinging side, means for pivotally mounting the swinging side on the bottom bar, a keeper carried by the upper end of the swinging side and adapted to engage the top bar, a slide adjustably mounted on the top bar, a clamping bolt for locking the slide in an adjusted position, a second bolt extending through the slide, a latch member pivotally mounted on the second bolt and adapted to engage the keeper to lock the swinging side in a closed position, and a spring mounted upon the clamping bolt and engaging the latch member to hold the latter normally in operative position.

In testimony whereof I affix my signature.

RUDOLPH J. LANGER.